United States Patent Office 3,347,756
Patented Oct. 17, 1967

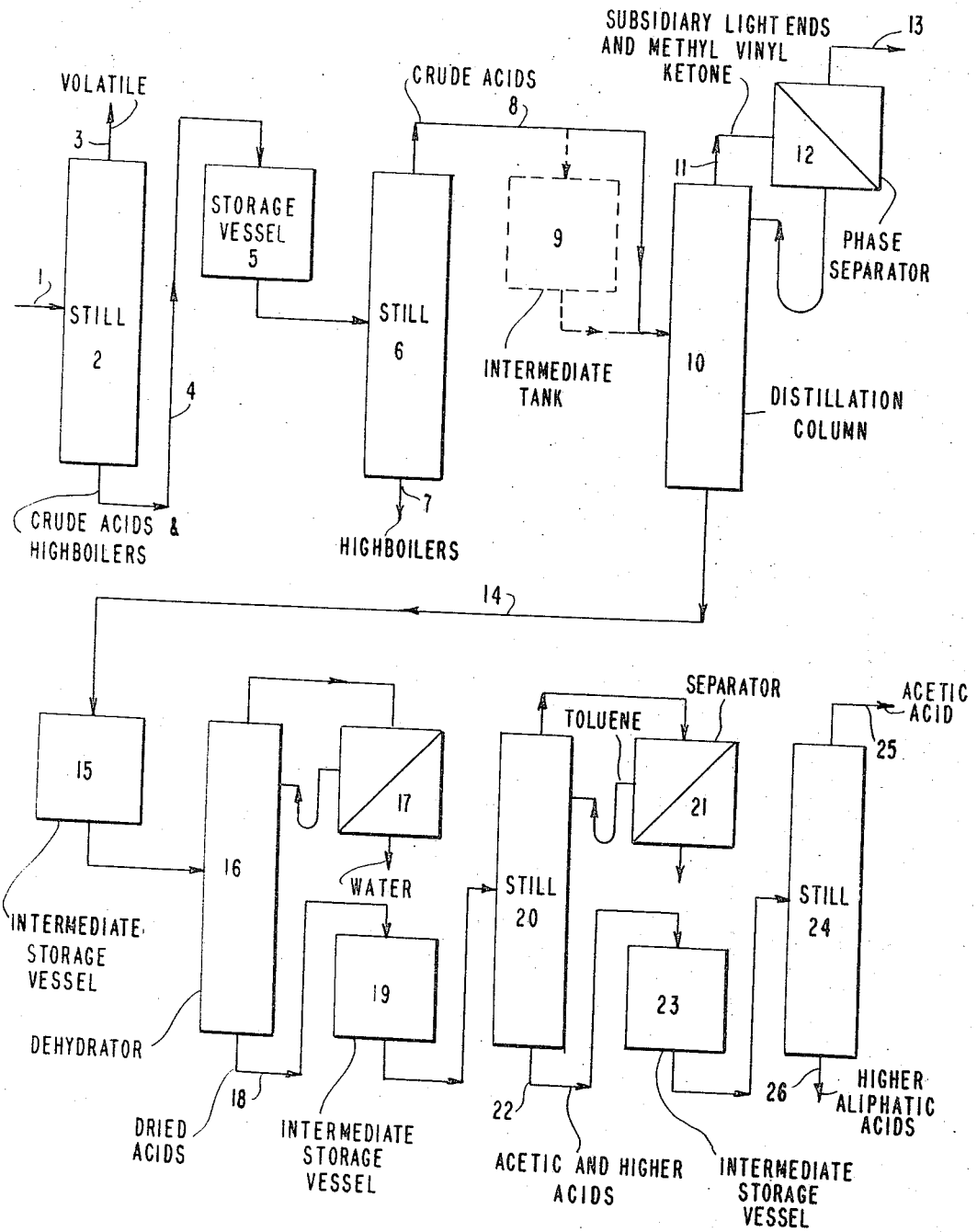

3,347,756
PRODUCTION OF PURE ACETIC ACID FROM METHYL VINYL KETONE BY DISTILLATION
Ronald Charles Snell, Stoneleigh, Surrey, England, assignor to The Distillers Company Limited, Edinburgh, Scotland, a British company
Filed Oct. 23, 1963, Ser. No. 318,416
Claims priority, application Great Britain,
Nov. 8, 1962, 42,204/62
14 Claims. (Cl. 203—32)

The present invention relates to the production of pure acetic acid.

It is a requirement of specifications for pure acetic acid that the amount of permanganate reducing impurity present should be low. For example, the B.P. requires a permanganate time (as defined therein) of at least 30 seconds; the U.S.P. requires a permanganate time (as defined therein) of at least 120 minutes, and the Analar Reagent Standard requires a permanganate time (as defined therein) of at least 120 minutes. Commercial practice often requires that the permanganate time be even better than these standards. It should be noted that the greater the purity, the higher is the permanganate time. It is also a requirement that such acid should meet the B.P. test (as defined therein) for odor produced on neutralisation.

The production of acetic acid by the liquid phase oxidation of paraffin hydrocarbons with molecular oxygen has already been proposed. The oxidation product contains (a) light ends, boiling up to 99° C. in the presence of water, (b) water, (c) aliphatic monocarboxylic acids of 1 to 4 carbon atoms and (d) high boiling residues, and the acetic acid may be recovered from this product by a series of distillation steps, for instance as described and claimed in British Patent No. 771,992. The acetic acid produced in this way has not always passed the various tests for permanganate time set out above, and there has been no straight-forward explanation for this random variation in quality.

The present invention is based on the discovery that the paraffin hydrocarbon oxidation product contains small amounts of unsaturated ketones, e.g. methyl vinyl ketone or methyl isopropenyl ketone but mainly methyl vinyl ketone.

These are capable of reacting reversibly with the acids to form condensation products which, unlike the parent ketones, are saturated and higher boiling than the $C_1$–$C_4$ acids. The failure of the recovered acetic acid to pass the tests for permanganate time is due to the presence of traces of the unsaturated ketones, in spite of one or more fractional distillation steps. The presence of condensation product in the final acetic acid has no effect on the permanganate time, but this and the free unsaturated ketones are responsible for objectionable odor or neutralisation.

The rate of cracking of the condensation product and of recombination of methyl vinyl ketone and acids depends upon temperature, the acid present and the concentrations of methyl vinyl ketone, acids and condensation product. Formic acid reacts faster than acetic acid. Substantial recombination of methyl vinyl ketone and formic acid will occur even in 5 minutes at 90° C. when excess formic acid is present.

According to the present invention the process for the recovery of pure acetic acid from acetic acid-containing mixtures derived from the liquid phase oxidation of paraffin hydrocarbons with molecular oxygen comprises removing the methyl vinyl ketone condensation product from the acetic acid-containing mixture and thereafter separating liberated methyl vinyl ketone from the acetic acid containing mixture before any substantial recombination of methyl vinyl ketone and acid takes place.

The removal of the methyl vinyl ketone condensation product from the acetic acid-containing mixture may be effected by a heat treatment at such a temperature to substantially decompose the condensation product into methyl vinyl ketone. Alternatively the removal may be effected by distilling the mixture to take off acetic acid and methyl vinyl ketone produced by cracking of the condensation product overhead leaving the uncracked portion of the condensation product in the residue. The kettle temperature in this distillation should be less than about 160° C./760 mm. or its equivalent at other operating pressures. Provision of some fractionating capacity is also desirable.

The separation of the liberated methyl vinyl ketone from the acetic acid-containing distillate may be effected by a variety of methods. For instance it may be removed by fractional distilltaion, either in the presence of water or under anhydrous conditions. Alternatively it may be hydrogenated into a compound such as methyl ethyl ketone or secondary butanol which do not condense with acetic acid in the same way and which may subsequently be removed from the acetic acid.

The essential feature of the process of the present invention is that whatever methods are employed for the removal and separation of combined and liberated methyl vinyl ketone the time and temperature during transfer between the removal and separation stages should be controlled so as to minimise reformation of the condensation product. For example at temperatures of 0° to 40° C. the total delay between stages, particularly in the presence of formic acid should be less than one hour, preferably less than 5 minutes. At 80° to 100° C., particularly in the presence of formic acid, the delay should be less than 5 minutes, preferably less than 1 minute.

It has further been found that in order to obtain the maximum benefit from this invention, it should preferably be applied at two different stages in the process, i.e. at two different stages there should be a removal of the condensation product followed by a separation of the liberated ketone.

By operation in accordance with the process of the invention acetic acid having a permanganate time (as defined in the B.P.) of more than 24 hours may readily be obtained.

The necessary operations in accordance with the invention may be combined, if desired, with the removal of other high and low boiling impurities in the process, as shown in the following examples, provided that the delay time between removal of the condensation product and separation of the liberated ketone is minimised.

The following examples are given to illustrate the process of the present invention. In the examples the amount of permanganate reducing impurity is expressed as the "permanganate index," which is determined as follows:

50 ml. of 5% w./w. sulphuric acid is placed in a 250 ml. conical flash, immersed in a bath at 20° C., a 5 ml. sample of the acetic acid is added, and the mixture is titrated with 0.1% (N/30) potassium permanganate until a rose-pink color persists for one minute. The "permanganate index" is then twenty times the titration in ml. i.e. the number of mls. of 0.1% permanganate required by 100 ml. of sample under the defined conditions.

It should be noted that the greater the purity, the lower the permanganate index.

*Example 1*

The apparatus employed in the process of this example is shown diagrammatically in the accompanying drawing. It was made mainly of glass and was on a laboratory seale. An oxidation product, obtained by the liquid phase oxidation of a C4 to C8 paraffin hydrocarbon fraction was introduced by line 1 into a continuous still 2 operated at a head temperature of about 60° C. From the head of the still the major part of the volatile light ends were removed by line 3, and from the base of the still, the base product comprising the acids were removed by line 4 to a storage vessel 5. From 5, the base product was fed to a continuous still 6 wherein it was fractionally distilled to separate the crude mixture of acids from the higher boiling material, including methyl vinyl ketone condensation product, the column being operated at a head temperature of about 105° C. and at a base temperature of about 150° to 155° C. The higher boiling residues and the condensation product were taken off by line 7, and the distillate comprising the aqueous aliphatic acids was taken off by line 8 fed to a continuous distillation column 10 either directly or after storage in the intermediate tank 9. The column 10 was operated with the head temperature at about 98° C. The cooled distillate comprising methyl vinyl ketone and subsidiary light ends was passed via line 11 to a phase separator 12 where the distillate separated into two phases, all of the lower aqueous phase being refluxed and the upper organic phase being removed through line 13. The base product, comprising the aqueous acids, was removed by line 14 and passed to an intermediate storage vessel 15, from which it passed to a continuous dehydrating still 16 using isopropyl ether as entrainer. The overheads from the column were taken to a phase separator 17, the separated isopropyl ether layer returned to the column and the water removed. The still base product, comprising the dried acids, was passed by line 18 to an intermediate storage vessel 19 and thence to a continuous still 20 using toluene as entrainer. The overheads from the column were taken to a phase separator 21, the upper layer comprising toluene being returned to the column. The still base product was passed by line 22 to an intermediate storage vessel 23, and thence to a continuous fractionation still 24 to separate as the overheads by line 25 acetic acid. The still base product removed by line 26 comprised the higher aliphatic acids.

A series of runs were carried out in which the distillate mixture from still 6 after cooling rapidly to below 30° C. was either passed directly as liquid feed with no storage into still 10, or was stored for varying lengths of time at room temperature in the intermediate tank 9. The results are shown in Table 1.

TABLE 1

|  | Run No. | | | |
| --- | --- | --- | --- | --- |
|  | 1 | 2 | 3 | 4 |
| Storage time between stills 6 and 10, hours | 1 0 5-6 | 1-2 10 | 3-4 20-30 | 48 100 |
| Permanganate index of acetic acid |  |  |  |  |

¹ Direct liquid feed with no storage between stills 6 and 10.

A permanganate index of 5–6 corresponds to permanganate time (B.P. of more than 24 hours while a permanganate index of 100 corresponds to a permanganate time of a few seconds only. It can be seen from Table 1 when the cold acetic acid-containing mixture from which the methyl vinyl ketone condensation product has been removed is not immediately, i.e. within one to two hours, treated to separate liberated methyl vinyl ketone, the amount of permanganate reducing impurity in the final product is greatly increased.

*Example 2*

The apparatus employed in the process of this example is shown diagrammatically in the accompanying drawing with the addition of a further continuous fractional distillation column. Acetic acid from line 25 was fed to the mid point of this column, and about 5–10% containing free methyl vinyl ketone was removed as an overhead product. Pure acetic acid was removed as a vapor stream from the kettle of this column. Still 24 then comprised the second stage of removal of methyl vinyl ketone condensation products and any liberated methyl vinyl ketone was removed in the additional column.

The whole apparatus was erected on a pilot plant scale and was made of stainless steel or copper.

Two series of runs were carried out in which the distillate mixture from still 6, after cooling rapidly to below 30° C. was passed either directly (total hold-up in condenser, pipes etc. ca. 10 min.) into still 10 or was stored at 20° C. for 4 hours in the intermediate tank 9. The acetic acid produced in line 25 was further topped in the additional column. The total hold-up time between still 24 and the new still was less than 1 hour at 20° C. The results are shown in Table 2.

TABLE 2

| Storage time between stills 6 and 10, minutes | 10 | 240 |
| --- | --- | --- |
| Permanganate index of acetic acid in line 25 | 20 | 100 |
| Permanganate index of topped acetic acid | 5 |  |

Only the acetic acid of permanganate index 5 was odorless on neutralisation. It can be seen that reduction of storage time between stills 6 and 10 improved the permanganate index considerably but a further stage of removal of methyl vinyl ketone was necessary to obtain acid of permanganate index 5.

*Example 3*

The apparatus employed in the process of this example was exactly as in Example 2. The scale was increased to full plant scale.

Two series of runs were carried out in which the distillate mixture from still 6, was passed directly (total hold-up in condenser, pipes etc. ca. 5 minutes) into still 10, the temperature of this distillate being either 90–95° C. or 20–25° C. The acetic acid produced in line 25 was further topped in the additional column. The total hold-up between still 24 and the additional still was about 10 minutes at 20–25° C. The results are shown in Table 3.

TABLE 3

| Temperature of distillate between stills 6 and 10, ° C | 90 | 20-25 |
| --- | --- | --- |
| Permanganate index of acetic acid in line 25 | 150 | 30 |
| Permanganate index of topped acetic acid | 30 | 4 |

Only the acetic acid of permanganate index 4 was odorless on neutralisation. It can be seen that with minimum hold-up in condenser, pipes, etc. ca. 5 minutes) into still from still 6 to 20–25° gave acetic acid in line 25 of improved permanganate index, but a further stage of methyl vinyl ketone removal was necessary to obtain acid of permanganate index 4.

I claim:

1. In a process for the recovery of pure acetic acid from acetic acid containing mixtures obtained from the liquid phase oxidation of paraffin hydrocarbons with molecular oxygen, the improvement which comprises liberating by heat or distillation a mixture of methyl vinyl ketone and acetic acid from the resultant oxidation product which contains methyl vinyl ketone condensation product and separating by distillation the methyl vinyl ketone from the acetic acid mixture therewith such that the time and temperature between the liberation step and the separation step are:
 (a) acetic acid mixture at a temperature of from 80° C. to 100° C. for not more than 5 minutes; or
 (b) acetic acid mixture at a temperature of from 0° C. to 40° C. for not more than 1 hour.

2. The improvement according to claim 1 wherein the separation of liberated methyl vinyl ketone is carried out by fractional distillation in the presence of water.

3. The improvement according to claim 1 wherein the separation of liberated methyl vinyl ketone is carried out by fractional distillation under anhydrous conditions.

4. The improvement according to claim 1 wherein the sequence of removal of condensation product followed by the separation of liberated ketone is applied to the acetic acid containing mixture at least twice during the overall process for the recovery of pure acetic acid.

5. The improvement according to claim 1 carried out in combination with treatments of the acetic acid containing mixture for the removal of other impurities.

6. In a process for the recovery of pure acetic acid from acetic acid containing mixtures obtained from the liquid phase oxidation of paraffin hydrocarbons, the improvement which comprises liberating by distillation methyl vinyl ketone which is in a mixture with acetic acid from the resultant oxidation product which contains methyl vinyl ketone condensation product and separating by distillation the methyl vinyl ketone from the acetic acid mixture such that the time and temperature between the liberation step and the separation step is such that the acetic acid mixture is at a temperature of from 80° C. to 100° C. for not more than 5 minutes.

7. The improvement according to claim 6 wherein the acetic acid mixture is at a temperature of from 80° C. to 100° C. for less than 1 minute.

8. In a process for the recovery of pure acetic acid from acetic acid containing mixtures obtained from the liquid phase oxidation of paraffin hydrocarbons, the improvement which comprises liberating by heat or distillation methyl vinyl ketone which is in a mixture with acetic acid from the resultant oxidation product which contains methyl vinyl condensatiop product and separating by distillation the methyl vinyl ketone from the acetic acid mixture therewith such that the time and temperature between the liberation step and the separation step is such that the acetic acid mixture is at a temperature of from 0° C. to 40° C. for not more than 1 hour.

9. The improvement according to claim 8 wherein methyl vinyl ketone is liberated from the methyl vinyl ketone condensation product of the oxidation product by heating the oxidation product to a temperature sufficient to decompose the condensation product substantially, completely to methyl vinyl ketone.

10. The improvement according to claim 8 wherein methyl vinyl ketone is liberated from the acetic acid containing mixture by distilling the mixture to crack the methyl vinyl ketone condensation product of the oxidation product, taking off the acetic acid overhead together with the thereby formed methyl vinyl ketone and leaving the uncracked portion of the condensation product as residue.

11. The improvement according to claim 10 wherein distillation of the mixture to remove the condensation product is carried out with still base conditions of temperature and pressure of less than about 160° C. at 760 mm. pressure.

12. The improvement according to claim 8 wherein the liberated methyl vinyl ketone is hydrogenated into a compound which does not condense with acetic acid followed by separation of such a compound from the acetic acid.

13. The improvement according to claim 12 wherein the liberated ketone is hydrogenated into methyl ethyl ketone.

14. The improvement according to claim 12 wherein the liberated ketone is hydrogenated into secondary butanol.

References Cited
UNITED STATES PATENTS

| | | | |
|---|---|---|---|
| 2,800,506 | 6/1957 | Millidge et al. | 260—533 |
| 2,861,923 | 11/1958 | Elce et al. | 260—541 |
| 2,884,451 | 4/1959 | Graham | 203—32 |
| 2,926,191 | 2/1960 | Lawson-Hill et al. | 260—533 |

NORMAN YUDKOFF, *Primary Examiner.*

WILBUR L. BASCOMB, Jr., *Examiner.*